United States Patent
Shah et al.

(10) Patent No.: US 6,332,076 B1
(45) Date of Patent: Dec. 18, 2001

(54) METHOD AND SYSTEM FOR IDENTIFYING AND ANALYZING DOWNLINK INTERFERENCE SOURCES IN A TELECOMMUNICATIONS NETWORK

(75) Inventors: Ali R. Shah, Dallas; Hossam H'mimy, Plano, both of TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/370,777

(22) Filed: Jun. 28, 1999

(51) Int. Cl.[7] .................................................. H04Q 7/20
(52) U.S. Cl. ........................ 455/423; 455/63; 455/67.3; 455/501
(58) Field of Search ............................. 455/423, 63, 62, 455/64, 67.3, 424, 501, 504, 135, 161.3, 283, 296

(56) References Cited

U.S. PATENT DOCUMENTS

| | | | |
|---|---|---|---|
| 5,179,722 | * | 1/1993 | Gunmar et al. ................. 455/423 |
| 5,241,690 | * | 8/1993 | Larsson et al. ................. 455/67.3 |
| 5,355,514 | * | 10/1994 | Borg ................................ 455/63 |
| 5,499,395 | * | 3/1996 | Doi et al. ........................ 455/423 |
| 5,530,917 | * | 6/1996 | Andersson et al. ............. 455/423 |
| 5,596,570 | * | 1/1997 | Soliman ........................... 455/423 |
| 5,752,164 | | 5/1998 | Barclay ............................ 455/33.1 |
| 5,839,074 | * | 11/1998 | Plehn ................................ 455/63 |

* cited by examiner

*Primary Examiner*—Lee Nguyen
*Assistant Examiner*—Simmon Nguyen
(74) *Attorney, Agent, or Firm*—Ericsson Inc.

(57) ABSTRACT

A method and system for determining sources of downlink interference in a telecommunications network having offending cells and disturbed disposed therein. Initially, mobile traffic events in offending cells within the telecommunications network are identified. Disturbance events in disturbed cells within the telecommunications network are also determined. The identified mobile traffic events are then correlated with the identified disturbance events in order to detect possible sources of disturbance within the telecommunications network. A disturbance distribution for each disturbed cell within the telecommunications network is thereafter computed, when all identified mobile traffic events are correlated with the all identified disturbance events, thereby enabling network engineers to optimize the telecommunications network by minimizing downlink interference. The method and system are thus based on measurements and not predictions, so that the measurements take into account the behavior of all mobiles within the telecommunications network rather than a particular mobile event.

19 Claims, 5 Drawing Sheets

| Signal Quality Level/ BER Class | BER (%) for D-AMPS | BER (%) for GSM |
|---|---|---|
| 0 | Below 0.01 | Below 0.2 |
| 1 | 0.01 - 0.1 | 0.2 - 0.4 |
| 2 | 0.1 - 0.5 | 0.4 - 0.8 |
| 3 | 0.5 - 1.0 | 0.8 - 1.6 |
| 4 | 1.0 - 2.0 | 1.6 - 3.2 |
| 5 | 2.0 - 4.0 | 3.2 - 6.4 |
| 6 | 4.0 - 8.0 | 6.4 - 12.8 |
| 7 | Above 8.0 | Above 12.8 |

METHOD AND SYSTEM FOR IDENTIFYING AND ANALYZING DOWNLINK INTERFERENCE SOURCES IN A TELECOMMUNICATIONS NETWORK

BACKGROUND OF THE INVENTION

1. Technical Field of the Invention

The present invention is related to wireless telecommunications networks. In particular, the present invention relates to cellular telephone networks. More particularly, the present invention relates to techniques for analyzing downlink interference in a wireless telecommunications network. Still more particularly, the present invention relates to techniques for identifying interfering sources in wireless telecommunications networks.

2. Description of the Related Art

Present-day mobile telephony has spurred rapid technological advances in both wireless and non-wireless areas. The telecommunications industry is a rapidly growing industry, with advances, improvements, and technological breakthroughs occurring on an almost daily basis. Many mobile telecommunications systems, among them the European GSM-system, have already passed through several basic development phases and system designers are now concentrating on further improvements to the systems, including system refinements and the introduction of optional services.

Most wireless telecommunication systems currently in use are implemented as cellular telephone networks. Cellular telephone networks typically are composed of a group of base stations connected to a centrally located switch. This centrally located switch is commonly referred to as a Mobile Switching Center (MSC). Base stations are usually spaced apart from each other by distances of between one-half and twenty kilometers. Each base station is assigned a number of two-way voice and control channels. The voice channels transmit voice signals to and from proximately located mobile stations, and transmit control information to and from these mobile stations, usually for the purpose of establishing a voice communications link.

A typical cellular telephone network also includes a group of interconnected mobile switching centers, which operate in association with a gateway mobile switching center through which the cellular telephone network interconnects with a conventional public switched telephone network (PSTN). In addition, at least one home location register (HLR) operates within the cellular telephone network. The HLR stores network subscriber information, including the identified location of current mobile stations within the network.

In response to an incoming call dialed to a mobile station, a signal is sent to the home location register requesting routing information through the network to the called mobile station. The home location register "looks up" the current location of the mobile station and contacts the currently serving mobile switching center to pre-route the call and retrieve a temporary location directory number, which is utilized to route the call through the cellular telephone network for delivery to the mobile station. The serving mobile switching center retrieves from a visitor location register (VLR), the identification of the cell within which the called mobile station is currently located. The mobile switching center then instructs the base station associated with that particular cell to page the mobile station. Responding to the page, the mobile station requests assignment of a channel, and the network routes the call through the serving mobile switching center and over the assigned channel.

It is important to identify those cells within the cellular telephone network, which are sources (offenders) of and subject (victims) to radio disturbances. A radio disturbance event typically occurs during a cellular call, either on the downlink from a base station to a mobile station (e.g., a cellular telephone), or during an uplink. A radio disturbance occurs due to several possible reasons, including co-channel interference, adjacent channel interference or external interference. Various methods exist for identifying a disturbed call. In order to identify cells that are disturbed (i.e., "victims" of disturbance), a comparison of signal strength versus a measurement of speech quality can be employed (i.e., bit error rate). When sufficient signal strength is correlated with degraded speech quality for an extended period of time, usually measured in seconds, that cell can be considered "disturbed." The length of time is dependent on the technology available and the measurement method utilized. Failure to identify and analyze sources of radio disturbances and the disturbed cells in the cellular telephone network results in poor communication customer dissatisfaction.

Various methods and systems currently exist for identifying disturbed cells within cellular telephone networks. One of the most widely utilized methods involves downlink interference prediction tools. Such tools predict where interference may exist within a given cellular telephone network. The predictions are then utilized for frequency and cell planning, particularly in initial network designs. The validity of such predictions is dependent on a number of factors, including the accuracy of the propagation model utilized, the resolution of the terrain data, and so forth. Such tools are helpful in identifying the cells that are causing the downlink interference, but taken together are often inaccurate because of the dependence on predictions.

Another method utilized to identify disturbed and offending cells involves drive testing. The drive test approach includes method steps of turning off all co-channel transmitters within a particular cell and then keying each transmitter up individually. An associated drive test time, in the meantime, drives the area in a motorized vehicle to observe any possible interference. This method is inherently very labor intensive and costly. In addition, the drive-test approach, while sometimes useful, does not take into account variations in mobile station types. The drive test approach is also quite expensive because it requires intensive resources. Each possible offending frequency is "keyed-up," while the remaining frequencies are turned off, in order to identify offenders.

From the foregoing, it can be appreciated that a need exists for a reliable method and system for identifying and analyzing sources of downlink interference in cellular radio networks, without the difficulties and expense associated with the methods described above. Such a method and system, if implemented, would serve to promote increased efficiency in downlink interference identification and analysis in wireless telecommunications networks, such as cellular radio networks, which in turn would promote optimization of network functions and operations.

SUMMARY OF THE INVENTION

It is therefore one object of the present invention to provide an improved wireless telecommunications network.

It is another object of the present invention to provide an improved cellular telephone network.

It is still another object of the present invention to provide a method and system for analyzing downlink interference in a wireless telecommunications network, such as a cellular telephone network.

It is yet another object of the present invention to provide a method and system for identifying interfering sources in wireless telecommunications networks.

The above and other objects are achieved as is now described. A method and system for determining sources of downlink interference in a telecommunications network having offending cells and disturbed disposed therein. Initially, mobile traffic events in offending cells within the telecommunications network are identified. Disturbance events in disturbed cells within the telecommunications network are also determined. The identified mobile traffic events are then correlated with the identified disturbance events in order to detect possible sources of disturbance within the telecommunications network. A disturbance distribution for each disturbed cell within the telecommunications network is thereafter computed, when all identified mobile traffic events are correlated with the all identified disturbance events, thereby enabling network engineers to optimize the telecommunications network by minimizing downlink interference. The method and system are thus based on measurements and not predictions, so that the measurements take into account the behavior of all mobiles within the telecommunications network rather than a particular mobile event.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
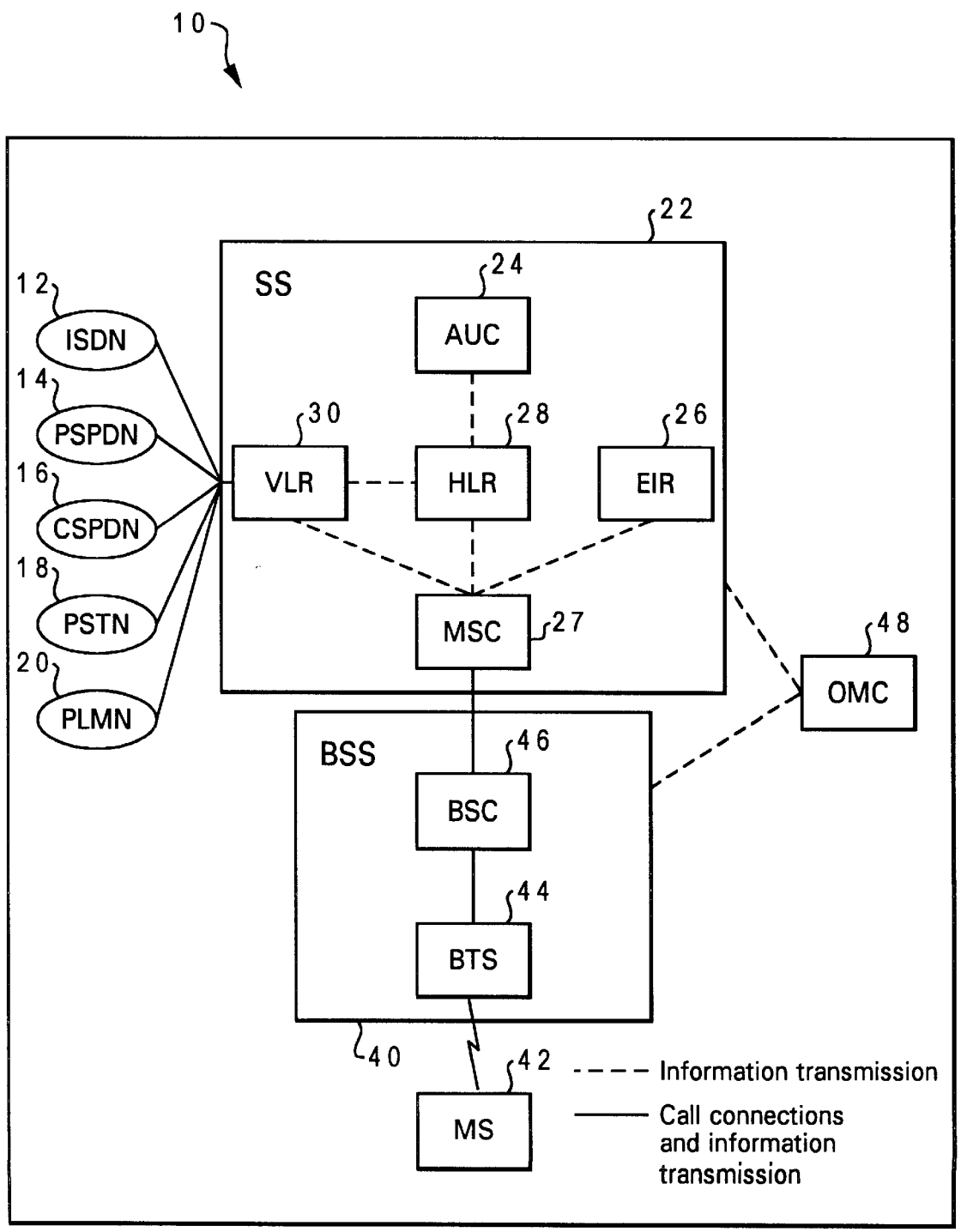
FIG. 1 depicts a block diagram illustrative of a telecommunications network in which a preferred embodiment of the present invention may be implemented.

Reference is now made to FIG. 1, wherein a block diagram illustrates a telecommunications network 10 in which a preferred embodiment of the present invention may be implemented. Telecommunications network 10 depicted in FIG. 1 is divided into a Switching System (SS) 22 and a Base Station System (BSS) 40. Each of these systems contains a number of functional units, which process information and carry out operations of a functional telecommunications network. The functional units themselves may be implemented utilizing various telecommunications hardware devices.

Switching System (SS) 22 is composed of a Visitor Location Register (VLR) 30, a Home Location Register (HLR) 28, an Authentication Center (AUC) 24, an Equipment Identity Register (EIR) 26, and a Mobile Switching Center (MSC) 27. Base Station System (BSS) 40 is composed of a Base Station Controller (BSC) 46 and a Base Transceiver Station (BTS) 44. An Operations and Maintenance Center (OMC) 48 is connected to equipment present within Switching System (SS) 22 and to BSC 46. The dashed lines in FIG. 1 represent information transmission, while solid lines represent both call connections and information transmission.

Telecommunications network 10 illustrated in FIG. 1 may be realized as a network of neighboring radio cells, which together provide complete coverage for a service area. The service area is the geographic area served by a given telecommunications supplier, and is the area in which the supplier stands ready to provide its service. The service area of New York Telephone, for example, is most (but not all) of New York State. Each cell contains a base station transceiver (BTS) operating on a set of radio channels. These channels differ from the channels utilized by neighboring cells in order to avoid interference.

Each base station controller (BSC) controls a group of base station transceivers. The base station controller controls well-known telecommunication functions, such as "Handover" and power control. A number of base station controllers (e.g., BSC 46) are served by a mobile switching center (MSC) 27, which controls calls to and from a Public Switched Telephone Network (PSTN) 18. MSC 27 also controls calls to and from an Integrated Services Digital Network (ISDN) 12, a Public Land Mobile Network (PLMN) 20, a Circuit Switched Public Data Network (CSPDN) 16, and also, various private networks such as, for example, a Packet Switched Public Data Network (PSPDN) 14.

Each unit is actively involved in carrying speech connections between Mobile Station (MS) 42 and, for example, a subscriber in a fixed network, such as PSTN 18. Because of the extreme difficulties involved in completing an MS terminated telephone call, a number of databases located within the telecommunications network keep track of Mobile Station (MS) 42. The most important of these databases is Home Location Register (HLR) 28. When a user subscribes to a telecommunications network, such as the telecommunications network depicted in FIG. 1, the user is registered within Home Location Register (HLR) 28. Home Location Register (HLR) 28 contains subscriber information, such as supplementary services and authentication parameters.

Data describing the location of the MS, such as the area (i.e., the MSC area) in which the MS presently resides, is contained within the Home Location Register (HLR) 28. The MSC area represents that portion of the telecommunications network covered by a single MSC. In order to route a call to a mobile subscriber within a telecommunications network, such as the telecommunications network depicted in FIG. 1, the path through the network links to the MSC in the MSC area where the subscriber is currently located. Data describing the location of the MS is thus actively altered as the MS moves from cell to cell within the telecommunications network. MS 42 sends location information, via MSC 27 and Visitor Location Register (VLR) 30, to an associated HLR, which permits MS 42 to receive calls. The Authentication Center (AUC) 24 is connected to Home Location Register (HLR) 28, and provides Home Location Register (HLR) 28 with authentication parameters and ciphering keys utilized for security purposes.

Visitor Location Register (VLR) 30 is a database that contains information regarding all mobile stations currently located in the MSC area. When MS 42 roams in a new MSC area, the VLR connected to the MSC in that particular area requests data about the MS from Home Location Register (HLR) 28. Simultaneously, Home Location Register (HLR) 28 is provided with the location of the MSC area in which MS 42 resides. If it is later desired to make a call from MS 42, Visitor Location Register (VLR) 30 will have at its disposal, all the information necessary for call set-up, without being forced to interrogate Home Location Register (HLR) 28 each time a call is made. Visitor Location Register (VLR) 30 thus functions as a distributed HLR. Visitor Location Register (VLR) 30 also contains precise information about the location of the MS in the MSC area.

If an individual subscriber within the fixed network PSTN 18 desires to make a call to a GSM subscriber, an exchange within PSTN 18 connects the call to an MSC equipped with a function commonly known as a "gateway" function. In the telecommunications arts, an MSC having a "gateway" function is commonly referred to as a Gateway MSC (GMSC). The MSC in telecommunications network 10 of FIG. 1 may be implemented as a Gateway MSC. Most MSC's within GSM telecommunications networks function as Gateway MSC's . The GMSC must find the location of the searched MS, which can be accomplished by interrogating the HLR where the MS is registered. The HLR then replies with the address of the current MSC area. Thereafter, the GMSC can re-route the call to the correct MSC. When the call reaches that MSC, the VLR will have additional information regarding the precise location of the MS. The call can then be switched through to completion.

The telecommunications network depicted in FIG. 1 may be implemented as a GSM-type network. Those skilled in the art can appreciate that although the present invention is described and illustrated in the context of a GSM network standard, the present invention may also be implemented in accordance with other standards and networks, including those utilized throughout North and South America. The GSM network standard, as discussed herein, is merely presented for illustrative purposes only and is not a limiting feature of the present invention.

Figures 2, 5:
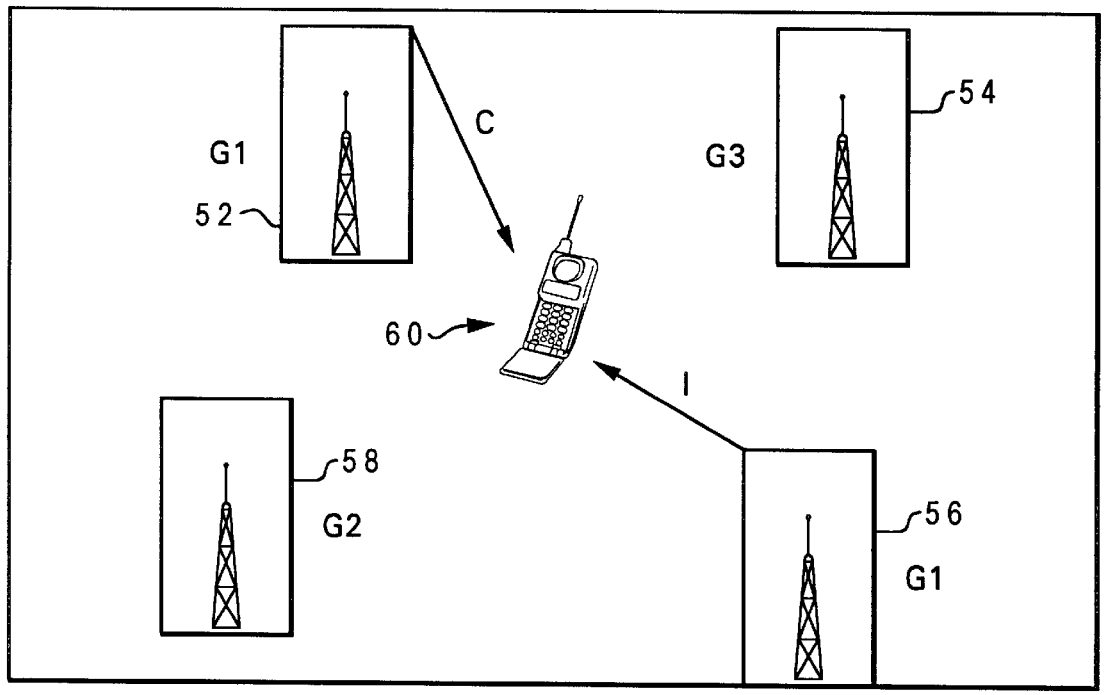
FIG. 2 illustrates a block diagram illustrative of downlink co-channel interference in a telecommunications network, in accordance with a preferred embodiment of the present invention.
FIG. 5 depicts a correlation matrix for possible co-channel offenders of disturbed cells, in accordance with a preferred embodiment of the present invention.

FIG. 2 illustrates a block diagram 50 illustrative of downlink co-channel interference in a telecommunications network, in accordance with a preferred embodiment of the present invention. According to the method and system described herein, sources of downlink interference (i.e., offenders) are identified along with disturbed cells within a network such as that depicted and described in FIG. 1. The analysis is based on correlating call set-up events and thereafter correlating these events with "start times" and "stop times" of any perceived radio disturbances. The time correlation generates a list of "offending cells" and "disturbed cells". This correlation then permits the perceived interference in a co-channel cell to be associated with a possible source of disturbance. Statistical methods are employed thereafter to determine definite disturbance sources.

FIG. 2 thus illustrates an example of downlink co-channel interference. Radio base stations 52, 54, 58 and 56 are depicted in FIG. 2, along with mobile station 60 (i.e., a cellular telephone). Those skilled in the art can appreciate that mobile station 60 of FIG. 2 is analogous to mobile station 42 of FIG. 1. In the example depicted in FIG. 2, base stations 52, 54, 58 and 56 are transmitting with frequencies G1, G2, and G3. Mobile station 60 utilizes two of these frequencies due to frequency reuse.

Mobile station 60 utilizes frequency G1 to receive information from base stations 52 and 56. Mobile station 60 receives carrier "C" which is transmitted from base station 52 at frequency G1 and interference "I", which is transmitted from a co-channel radio base station (i.e., base station 56), also at frequency G1. The radio base station contributing to the interference is termed as the "offender," and the cell in which it resides is referred to as the "offending cell." Mobile station 60, which is affected by co-channel 20 interference, is referred to in the parlance utilized herein as "disturbed," and belongs to the "disturbed cell."

Sources of disturbance are not, however, confined to co-channel radio base stations. Another source of disturbance can be found in adjacent channel base stations, which are still considered as internal disturbance sources. The invention described herein functions in a manner that identifies all possible sources of interference within a telecommunications network. Those skilled in the art will appreciate that the terms "disturbance" and "interference" can be utilized interchangeably. Such terms are utilized interchangeably herein.

A "radio disturbance" or "disturbance event" on a downlink is detected when sufficient signal strength is correlated in time with degraded speech quality for a period greater than $\Delta$ seconds. The length of time is dependent on the hardware and measurement method utilized. Speech quality is measurable as C/I (i.e., Carrier to Interference ratio) or BER (i.e., Bit Error Rate).

In accordance with a preferred embodiment of the present invention, sources of downlink interference can be analyzed in the following manner. Initially, possible sources of disturbance can be detected by correlating cell traffic events with disturbance recordings. Definite sources of disturbance can then by verified utilizing propagation considerations. Thereafter, a test can be performed to verify if all disturbances have been correlated with mobile traffic events. If all disturbances have been successfully correlated with mobile traffic events, then a disturbance distribution is computed for each disturbed cell. Improvements are then recommended by trading coverage with interference. Long term improvements to the system can also be recommended based on the disturbance distribution. If, however, all disturbances are not successfully correlated with mobile traffic events, then external interference sources are identified. An alternative approach involves identifying the disturbed cells and then concentrating on those identified disturbed cells, rather than the entire telecommunications network or system.

Figure 3:
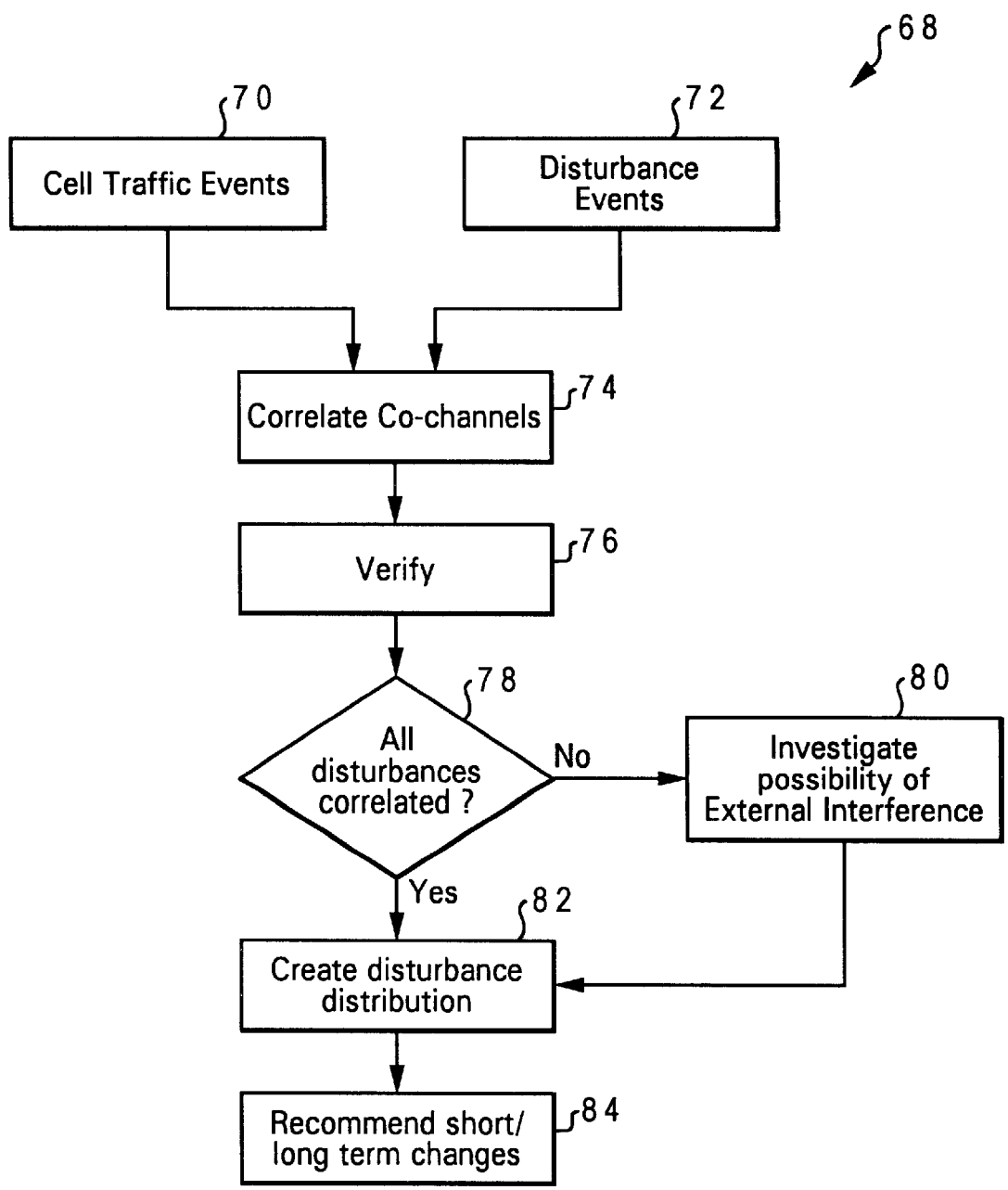
FIG. 3 depicts a high-level logic flow diagram illustrating process steps for implementing the method and system of the present invention, in accordance with a preferred embodiment of the present invention.

FIG. 3 illustrates a high-level logic flow diagram 68 illustrating process steps for implementing the method and system of the present invention, in accordance with a preferred embodiment of the present invention. It can be appreciated by those skilled in the art that FIG. 3, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile telephone subscriber unit, instructions implementing these method steps. Such instructions can be maintained within a computer memory location of a wireless telephone base station or at a central broadcasting center from which such base stations receive instructions. Implementation of the method described herein is left to the discretion of a particular wireless telephone system designer, whether cellular-based or otherwise.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 3. While the present invention is described in the context of a fully functional telecommunications network, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a memory of microcomputer. Alternatively, a preferred embodiment of the present invention can include a program product residing in a microcomputer memory located at an MSC (e.g., MSC 27 of FIG. 1 herein). The MSC controls system operations in cellular telephone networks, thereby managing calls, tracking billing information, and locating cellular subscribers. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Thus, as depicted at block 70 of FIG. 3, cell traffic events in a telecommunications network are identified. As illustrated at block 72, disturbance events within the telecommunications network are also identified. Thereafter, as described at block 74, possible sources of disturbance are detected by correlating cell traffic events with disturbance recordings (i.e., identified disturbance events). As illustrated next at block 76, definite sources of disturbance are verified utilizing propagation considerations or propagation models. Thereafter, as indicated at block 78, a test is performed to determine whether or not all disturbances have been correlated with mobile traffic events, in accordance with the present invention described herein.

If all disturbances are not correlated, then as depicted at block 80, an attempt is made to identify possible sources of external interference. Those skilled in the art will appreciate that disturbances may not all be attributable to mobiles associated with the offending cell. External sources can also be the cause of such disturbances. If all sources of disturbance are not correlated, then the possible sources of external interference must be investigated, as indicated at block 80.

Thereafter, as described at block 82, a disturbance distribution is created. Finally, as illustrated at block 84, short and longer-term changes to the telecommunications network are recommended, based on the results obtained from the disturbance distribution. If, however, all disturbances are correlated, as indicated at block 78, then as described at block 82, the disturbance distribution is created, thereby omitting implementation of the operation described at block 80. Following implementation of the function indicated at block 82, the operation described at block 84 occurs (i.e., recommendation of short and long term changes to the telecommunications network).

Short-term recommendations include trading off coverage versus interference between the disturbed and interfered cells. Other short-term recommendations include decreasing the power of the offender or decreasing interference in the disturbed cell at the cost of possible degraded coverage in the offender. Long-term recommendations include changing frequency plans, antenna down tilting for minimization interference sources, and so forth. If no internal sources of interference are identified according to the method and system described herein, then attention is paid to possible external sources of interference in other frequency bands.

Figure 4:
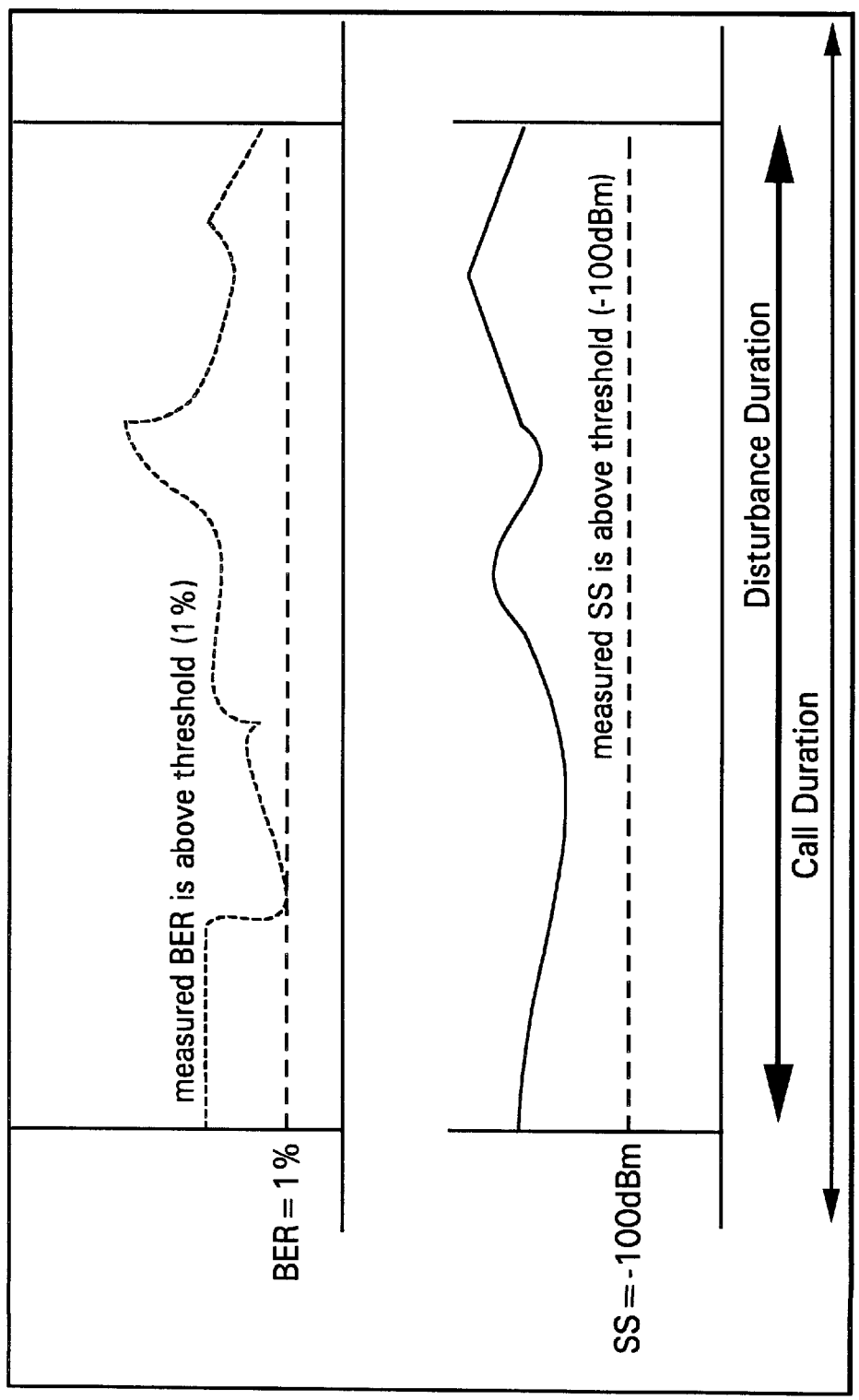
FIG. 4 illustrates a graphical diagram illustrating time correlation of cell traffic events with radio disturbances, in accordance with a preferred embodiment of the present invention.

FIG. 4 illustrates a graphical diagram 90 illustrating time correlation of cell traffic events with radio disturbances, in accordance with a preferred embodiment of the present invention. In the initial operations associated with the flow diagram of FIG. 3, possible sources of disturbance are identified. This search process correlates voice channel seizure events from cell traffic recordings with the start and stop time of disturbance recording. This correlation is accomplished utilizing disturbances and voice channel seizure time stamps. Co-channel information is considered at this stage. FIG. 4 thus illustrates this time correlation. As indicated in the illustration depicted in FIG. 4, a disturbance is described by a high BER with sufficient signal strength. The bit error rate (BER) and signal strength (SS) thresholds can be varied in accordance with network requirements.

To verify definite sources of disturbance, propagation considerations (i.e., a propagation model) are utilized. All co-channel cells for which calculated signal attenuation indicates that the cells are too far away to be able to generate perceived disturbances are excluded from further analysis. The propagation model takes into consideration the geographical position, antenna direction, antenna height, Effective Radiated Power (ERP), and so forth. A correlation matrix can thus be utilized to identify possible cells are that are potential offenders for each disturbed cell.

Thus, FIG. 5 depicts a correlation matrix 100 for possible co-channel offenders of disturbed cells, in accordance with a preferred embodiment of the present invention. As indicated in correlation matrix 100, each frequency group can have its own correlation matrix. The offenders are listed across the first row, while the disturbed cells are listed down the first column of the correlation matrix illustrated in FIG. 5. Similarly, a matrix of potential adjacent offenders can be created based on adjacent channel assignments.

These two matrices permit the identification of possible offenders within the telecommunications network. The next step involved in the statistical verification described herein is to correlate the number of times a particular cell had a call in progress when a disturbance was perceived in a co-channel/adjacent channel cell. If the number of correlations is statistically significant, that particular cell is labeled as the "offender" for the disturbed cell.

Figures 6, 7:
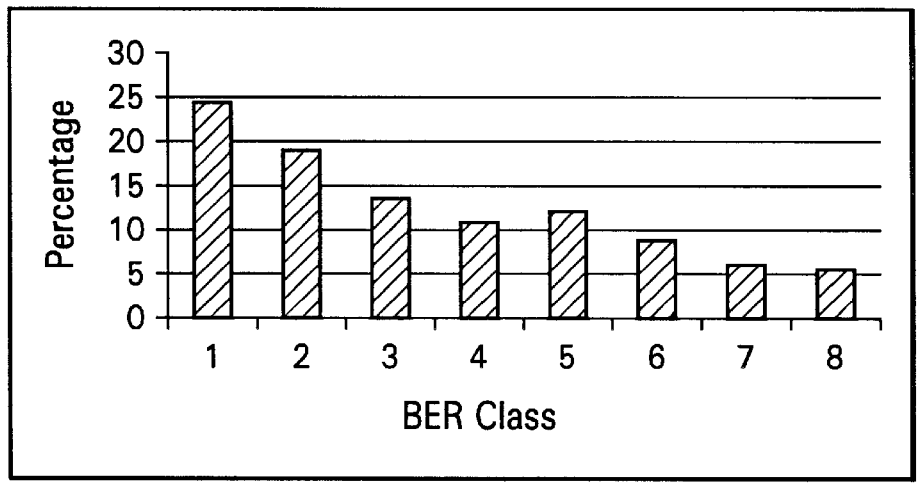
FIG. 6 illustrates a graphical diagram illustrating Bit Error Rate (BER) class distribution for each identified offending cell within a telecommunications network, in accordance with a preferred embodiment of the present invention.
FIG. 7 depicts a graphical diagram illustrating mapping of signal quality to Bit Error Rate (BER), in accordance with a preferred embodiment of the present invention.

FIG. 6 illustrates a graphical diagram 110 illustrating Bit Error Rate (BER) class distribution for each identified offending cell within a telecommunications network, in accordance with a preferred embodiment of the present invention. As a result of the operation described at block 82 of FIG. 3, a disturbance distribution such as that indicated in graphical diagram 110 of FIG. 6 can be created. In order to compute a disturbance distribution for each offender, a percentage of the time in which a call within an offending cell creates disturbances elsewhere in the telecommunications network must be identified. A list associated with the disturbed cells is created. As a result of a subsequent correlation and verification, a new list is created in which cells are ranked according to offending cells. This offender list weighted by the BER distribution for each BER class, as indicated hereafter in the graphical diagram depicted in FIG. 7. Those skilled in the art can therefore appreciate, based on graphical diagram 110 of FIG. 6, that the most offending cell creates the greatest disturbance and highest BER in the disturbed cells.

FIG. 7 depicts a graphical diagram 120 illustrating mapping of signal quality to Bit Error Rate (BER), in accordance with a preferred embodiment of the present invention. For digital cellular/PCS (Personal Communications Service), signal quality is obtained by quantizing the Bit Error Rate (BER) to eight discrete levels. The mapping from the BER to a particular signal quality level varies for D-AMPS (Digital Advanced Mobile Phone Service) as well as GSM systems. Thus, the corresponding BER for D-AMPS (IS-136), as well as GSM, is depicted in graphical diagram 120 for eight quality levels (0 to 7).

An alternative embodiment of the present invention involves identifying cells with interference problems by searching for those cell what have a high BER (i.e. greater than 1%) for good signal strength. Less than 5% of samples typically have signal strengths less than −100 dBM. As a result of identifying those cells that have a high BER, a list of such cells is compiled. These cells are identified via an associated mobile switching center (MSC). A determination is then made as to which devices within these cells also have interference problems by observing the cells contained within the compiled cell list. In addition, start and stop time for all calls having a BER greater than 1% and a signal strength greater than −100 dBM are also identified.

If too many telecommunications events (e.g., start and stop times) are identified, a re-correlation can be performed utilizing a greater delta value. A list of devices having high BER in each of the disturbed cells is then provided, in addition to a listing of disturbance events, including stop and start time, and a BER distribution and signal strength distribution. Thereafter, channel numbers associated with devices having high BER are identified. A list of channel numbers, along with data describing the distribution of such channel numbers, is also determined, including the cells within which such channel numbers are located.

Next, co-channel disturbance analysis, as described herein, is performed for the start and stop times identified earlier for the disturbed devices. Given the channel numbers identified earlier, co-channels are identified in which a call in progress was completely overlapped with a disturbance event. As a result of this calculation, a table of disturbed and offending cells is created, including a determination of how many correlations were found for each disturbed and offending pair. A disturbance distribution created by the possible offender is also created. This co-channel disturbance analysis can be repeated for adjacent channels and a table with adjacent channel offenders can also be created, similar to the table of disturbed and offending cells.

As a result of these calculations, possible offenders can be identified having the highest number of correlations. In addition, a determination can also be performed as to whether the offender's signal can possibly interfere with the disturbed cells. Thus, a list of possible offenders on the downlink can be compiled and this information can be utilized for short and long term recommendations, as described herein.

Those skilled in the art can thus appreciate that the invention described herein explains a method and system for identifying sources of downlink interference in a cellular system (i.e., a telecommunications network). By either reducing the offending radio base station output power or altering the frequency plan, interference can be mitigated. The method and system described herein are based on measurements, which provide an advantage over prediction models. In addition, the method and system presented herein utilizes "switch statistics" and therefore, does not involve costly drive testing procedures. In short, utilizing the method and system described herein results in improvements in the performance of a telecommunications network.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for analyzing downlink interference in a telecommunications network, said method comprising the steps of:
   recording real-time channel seizure events associated with first traffic channels within a first cell associated with said telecommunications network;
   identifying real-time disturbance events associated with second traffic channels within a second cell;
   correlating said real-time channel seizure events with said real-time disturbance events; and
   computing a disturbance distribution for said second cell by determining which ones of said real-time channel seizure events are causing ones of said real-time disturbance events within said second cell.

2. The method of claim 1 further comprising the step of determining that an external interfering source exists in response to a determination that not all of said real-time disturbance events have been correlated with one of channel seizure events.

3. The method of claim 1 wherein said step of correlating further comprises the step of correlating said real-time channel seizure events with start times and stop times associated with said real-time disturbance events.

4. The method of claim 1 wherein said real-time disturbance events are identified when sufficient signal strength is correlated in time with degraded speech quality associated with a particular traffic channel for a predefined duration.

5. The method of claim 4 wherein said step of identifying further comprises the step of identifying a particular one of said real-time disturbance events within said second cell with a high error rate having a signal strength greater than a particular threshold level.

6. The method of claim 1 further comprising the step of verifying said real-time disturbance events by utilizing propagation considerations within said telecommunications network.

7. An apparatus for analyzing downlink interference in a telecommunications network, comprising:
   means for recording real-time channel seizure events associated with first traffic channels within a first cell associated with said telecommunications network;
   means for identifying real-time disturbance events associated with second traffic channels within a second cell;
   means for correlating said real-time channel seizure events with said real-time disturbance events; and
   means for computing a disturbance distribution for said second cell by determining which ones of said real-time channel seizure events are causing particular ones of said real-time disturbance events within said second cell.

8. The apparatus of claim 7 further comprising means for determining that an external interfering source exists in response to determining that not all real-time disturbance events have been correlated with one of said real-time channel seizure events.

9. The apparatus of claim 7 wherein said means for correlating further comprises means for correlating said real-time channel seizure events with start times and stop times associated with said real-time disturbance.

10. The apparatus of claim 7 further comprising means for identifying said real-time disturbance events by identifying sufficient signal strength correlated in time with degraded speech quality associated with a particular traffic channel for a predefined duration.

11. The apparatus of claim 10 further comprising means for identifying a particular one of said real-time disturbance events within said second cell with a high error rate having a signal strength greater than a particular threshold level.

12. The apparatus of claim 7 further comprising means for verifying said real-time disturbance events by utilizing propagation considerations within said telecommunications network.

13. The apparatus of claim 7 wherein all of said means are included within a mobile switching center (MSC) serving said fast cell and said second cell.

14. An apparatus for analyzing radio interference in a telecommunications network wherein said telecommunications network includes two or more cells, each cell being served by a radio transceiver device, further comprising:
   a first monitor monitoring real-time channel seizure events associated with first traffic channels within a first cell associated with said telecommunications network;
   a determiner for identifying real-time disturbance events associated with second traffic channels within a second cell;
   a computer for correlating said real-time channel seizure events with said real-time disturbance events, wherein said computer further computes a disturbance distribution for said second cell by determining which ones of said real-time channel seizure events are causing particular ones of said real-time disturbance events.

15. The apparatus of claim 14 wherein said computer correlates said real-time channel seizure events with start times and stop times associated with said real-time disturbance events.

16. The apparatus of claim 14 wherein said determiner identifies a particular real-time disturbance event when sufficient signal strength is correlated in time with degraded speech quality associated with a particular traffic channel for a predefined duration.

17. The apparatus of claim 16 wherein said determiner further identifies a particular one of said real-time disturbance events having a high error rate with a signal strength greater than a particular threshold level.

18. The apparatus of claim 14 wherein said computer utilizes propagation consideration when computing said disturbance distribution.

19. The apparatus of claim 14 wherein said computer comprises a mobile switching center (MSC) associated with said first cell and said second cell.

* * * * *